United States Patent
Broadbent

(10) Patent No.: US 9,915,349 B2
(45) Date of Patent: Mar. 13, 2018

(54) DYNAMICALLY NON CONTACTING SEAL

(71) Applicant: AES Engineering Ltd., Mill Close (GB)

(72) Inventor: Thomas Broadbent, Glossop (GB)

( * ) Notice: Subject to any disclaimer, the term of this patent is extended or adjusted under 35 U.S.C. 154(b) by 59 days.

(21) Appl. No.: 14/315,032

(22) Filed: Jun. 25, 2014

(65) Prior Publication Data
US 2015/0001810 A1    Jan. 1, 2015

(30) Foreign Application Priority Data

Jun. 26, 2013    (GB) .................................. 1311327.9

(51) Int. Cl.
*F16J 15/3256*    (2016.01)
*F16J 15/16*    (2006.01)

(52) U.S. Cl.
CPC ......... *F16J 15/3256* (2013.01); *F16J 15/164* (2013.01)

(58) Field of Classification Search
CPC ....... F16J 15/025; F16J 15/3256; F16J 15/164
USPC ........ 277/353, 551, 549, 571–577, 433, 929
See application file for complete search history.

(56) References Cited

U.S. PATENT DOCUMENTS

| | | | | |
|---|---|---|---|---|
| 4,049,281 A | * | 9/1977 | Bainard | F16J 15/3256 277/307 |
| 4,185,838 A | * | 1/1980 | Danner | F16J 15/3264 277/412 |
| 4,516,783 A | * | 5/1985 | Mitsue | F16J 15/3256 277/353 |
| 4,817,966 A | * | 4/1989 | Borowski | F16J 15/164 277/366 |
| 4,822,055 A | * | 4/1989 | Hogan | F16J 15/3264 277/387 |
| 4,974,860 A | * | 12/1990 | Anzue | F16J 15/164 277/351 |
| 5,022,659 A | * | 6/1991 | Otto | F16C 19/34 277/309 |
| 5,024,364 A | * | 6/1991 | Nash | F16J 15/3228 156/294 |
| 5,067,732 A | * | 11/1991 | Szabo | F16J 15/324 277/563 |
| 5,096,207 A | * | 3/1992 | Seeh | F16J 15/3256 277/353 |
| 5,201,533 A | * | 4/1993 | Lederman | F16J 15/3264 277/551 |
| 5,588,210 A | * | 12/1996 | Lederman | F16J 15/3264 264/163 |
| 6,485,022 B1 | * | 11/2002 | Fedorovich | F16J 15/4474 277/303 |
| 8,191,900 B2 | * | 6/2012 | Suzuki | F16J 15/164 277/433 |
| 8,403,333 B2 | * | 3/2013 | Berdichevsky | F16J 15/164 277/353 |

(Continued)

*Primary Examiner* — Kristina R Fulton
*Assistant Examiner* — L. Susmitha Koneru
(74) *Attorney, Agent, or Firm* — Gary Baker; Quine IP Law Group

(57) ABSTRACT

The invention relates to a seal system comprising a stationary assembly having an angled profile, and a rotary assembly comprising a resiliently flexible rotary elastomeric member. When in a rest position, the rotary elastomeric member contacts the angled profile of the stationary assembly to seal a gap therebetween. On rotation of the rotary elastomeric member, the gap between the assemblies is opened to allow fluid flow therethrough.

12 Claims, 8 Drawing Sheets

(56) References Cited

U.S. PATENT DOCUMENTS

2004/0228558 A1* 11/2004 Cha .................... F16C 33/7883
                                                      384/486
2008/0054572 A1*  3/2008 Maskaliunas .......... F16J 15/322
                                                      277/551

* cited by examiner

DYNAMICALLY NON CONTACTING SEAL

RELATED APPLICATIONS

This application claims benefit and priority to UK patent application Dynamically Non Contacting Seal, GB 1311327.9, filed Jun, 26, 2013, which are incorporated in their entirety herein for all purposes.

FIELD OF INVENTION

The invention relates to a dynamically non contacting seal where a lubricating fluid is required to be sealed into a chamber and where it is advantageous that the risk of fluid ingress into a chamber is reduced.

BACKGROUND TO INVENTION

Lip seals are commonly used in a wide range of applications ranging from sealing electric motors, bearing housings, car engines, gear boxes etc. They are used to stop the ingress of fluids or solids from entering a chamber from the atmosphere whilst also simultaneously stopping egress of the lubricating fluids from escaping the equipment chamber. Essentially the aim of a lip seal is to therefore prevent the premature failure of rotating equipment through contamination or loss of the lubricating fluid.

In order to provide this fluid seal, lip seals comprise a single moulded rubber component, which fits into the equipment housing and contacts the rotating shaft. This, however, means that the seal that the lip seal provides deteriorates over time as the shaft and lip seal wear. This not only allows ingress of particulates and moisture into the chamber, thus reducing the bearing life, but also means that the shaft may be damaged in the process. This can, therefore, lead to extended downtime of equipment whilst lengthy and costly repair work is carried out, thereby resulting in reduced mean time before failure, which increases the operating costs of equipment.

An alternative to Lip Seals, which are widely used, are generically called bearing seals. Commonly these exist as two types: labyrinth seals; and mechanical seal bearing protectors. Labyrinth seals typically have a complex outer profile which is located adjacent and in close radial and axial proximity to a complex inner profile of the stationary component. Together these complex profiles provide a tortuous path preventing the passage of materials or fluids through the seal. Due to the non-contacting characteristics of the labyrinth design its use in flooded or pressurised environments is limited. Mechanical seal bearing protectors are therefore commonly used in these applications as contacting faces ensure that limited or no fluid is able to pass through the seal. The face pressure between the stationary and rotating faces, which ensures contact between the faces is maintained, is commonly produced through the use of magnets.

These bearing seals solve the limitations of a lip seal as they do not wear the shaft, however, due to inherent increased complexity and machined components they are more expensive and also require a larger cross sectional area to fit into and so are not suitable for all applications.

STATEMENTS OF INVENTION

The invention is directed to a seal system comprising:
a stationary assembly having an angled profile; and
a rotary assembly comprising a resiliently flexible rotary elastomeric member;
wherein, when in a rest position, the rotary elastomeric member contacts the angled profile of the stationary assembly to seal a gap therebetween.

Preferably, the seal system comprises a second position in which the rotary elastomeric member is flexed and is not in contact with the angled profile of the stationary component. The second position may be encountered when the rotary assembly is rotating. When the rotary assembly rotates, the flexible elastomeric member flexes under centripetal forces and moves away from the stationary component, thereby creating a gap therebeween to allow the flow of fluid, particularly air.

Advantageously, the stationary assembly and the rotary elastomeric member both comprise U-shaped profiles and they interlock with one another with the end of the rotary elastomeric member contacting the internal surface of the U-shaped stationary assembly. It is particularly useful that the assemblies each have a U-shaped profile along at least part of one element. This allows the two assemblies to engage one another, thereby creating a position for the rotary elastomeric member, which is located at the end of its respective U-shape, to contact the inside of the U-shape of the stationary element.

In one embodiment, the angled profile of the stationary assembly is formed by a rigid component, and, preferably, the rigid component is a metallic component. The stationary assembly may be formed as an integral structure or as a multiple part assembly, and the assembly may be metallic.

In an alternative construction, the angled profile of the stationary assembly is formed by way of a stationary elastomeric member connected to the stationary assembly.

It is advantageous that the elastomeric members both comprise respective portions that are aligned parallel with the respective stationary assembly and rotary assembly. This allows for a good connection to be created between the elastomeric members and their respective assemblies. The elastomeric members may be sandwiched between respective further components to keep them in place.

In a preferred arrangement at least one of the parts forming the stationary assembly or the rotary elastomeric member is provided with at least one sacrificial protrusion. This allows for easier installation of the parts because the necessary gaps can be established once the system has been operated for the first time by sacrificing the aligning protrusions or nibs, thereby creating a clearance between parts after installation.

It is advantageous that a plurality of sacrificial protrusions is provided on either or both of the stationary assembly and the rotary elastomeric member. Having a single protrusion may mean that either the part can be easily misaligned by rotation about the single protrusion on installation or the single protrusion may have a large surface area, thereby increasing the friction required to wear it down. Having a plurality of smaller protrusions allows the sacrificial parts to be worn efficiently whilst also allowing for reliable installation.

Preferably, the part of the rotary elastomeric member that contacts the angled profile of the stationary assembly is provided with an enlarged cross-sectional area, relative to the part of the rotary elastomeric member adjacent thereto. This increases the local mass of the section of the rotary elastomeric member that forms the 'gate' or seal between the assemblies, compared with the rest of the rotary elastomeric member or at least the part adjacent the enlarged section.

The increased mass results in a more responsive reaction to the centripetal forces, thereby providing a more reliable seal system.

Advantageously, the rotary elastomeric member contacts the stationary assembly at two locations. Where the rotary elastomeric member contacts the stationary assembly at two locations, the seal is more reliable. The two locations may be at the end of the U-shaped profile of the stationary assembly and at a position internal to the same U-shape.

Thus, the invention relates to a device for providing a seal between equipment housing and an equipment shaft comprising:
- a stator sealable to the equipment housing by at least one elastomeric member,
- a rotor sealable to the equipment shaft by at least one elastomeric member,
- the stator and rotor are in contact in stationary state thereby providing a seal,
- the contact between the stator and rotor no longer being present during rotation thereby not causing wear on the equipment or between the rotor and stator,
- the seal having unitised construction which ensures the rotor has restricted axial movement.

A device preferably wherein the rotor includes a sealing component which includes a first portion which, in use, is in sealing engagement with the shaft and a second portion which extends radially outwards of the first portion, the second portion being in sealing engagement with the stator when the shaft is not rotating, the sealing component being resiliently flexible such that the second portion disengages from the stator when the speed of shaft rotation is sufficient.

A device preferably wherein the stator includes a sealing component having a first portion which, in use, is in sealing engagement with a bearing chamber and a second portion extending radially inwards from the first portion and which is in sealing engagement with the second portion of the sealing component of the rotor when the shaft is not rotating.

A device more preferably wherein the sealing component of the stator is made of flexible material.

A device more preferably wherein the sealing component of the stator is made of rigid material.

A device preferably wherein the second portions of the stator and rotors have cross sections which are preferably V-shaped in profile.

A device preferably and according to any of the preceding statements, wherein the V-shaped portions of the stator and rotor members interlock with one another.

A device preferably wherein the first portion of the stator and rotor are parallel to the equipment housing and shaft.

A device preferably and according to any of the preceding statements, wherein the stator and rotor have limited axial movement with relation to one another due to one or more radially protruding members protruding from the first portion of the rotor and stator.

A device preferably and according to any of the preceding statements, wherein the angled section of the rotor culminates with a larger cross sectional area than the beginning portion of the angle.

A device preferably and according to any of the preceding statements, wherein the larger cross sectional portion is in contact with the stator V section whilst the invention is in stationary state.

A device preferably and according to any of the preceding statements wherein the rotary component is constructed of a suitably flexible material that will allow the larger cross sectional portion to lift from the second portion of the stator when rotated.

A suitably flexible material which is more preferably but not limited to being an elastomeric material.

A device preferably and according to any of the preceding statements wherein the stator has limited axial movement due to at least one axially protruding member which is in axial contact with the rotary radially protruding member.

A device preferably and according to any of the preceding statements wherein the rotary member has limited axial movement due to at least one axially protruding member which is in axial contact with the stationary radially protruding member.

Axially protruding members more preferably are located at the point of the V profile on the stationary and rotary members.

Axially protruding members more preferably provides minimal contact area between the stationary and rotary components.

Axially protruding members more preferably and according to any of the preceding statements are but not limited to being circular in cross sectional profile.

Axially protruding members more preferably and according to any of the preceding statements are but not limited to being constructed from a softer material than the radially protruding member that it is in axial contact with.

Radially protruding members preferably and according to any of the preceding statements, are constructed from metal and also contain axially protruding portions to allow overlap on the inner diameters of the parallel portion of the rotary and stationary members.

A device preferably and according to any of the preceding statements, wherein the stationary V profile culminates in protruding section which is parallel to the equipment shaft and chamber and contacts the rotary V profile in stationary state.

A device preferably and according to any of the preceding statements wherein the stationary member is manufactured from solely metallic materials and includes an annulus groove on its outer diameter wherein a toroidal sealing member resides to provide a fluid tight seal between the stationary member and the equipment housing.

BRIEF DESCRIPTION OF DRAWINGS

Embodiments of the invention will be described with reference to the accompanying drawings, wherein.

DETAILED DESCRIPTION

Figure 1:
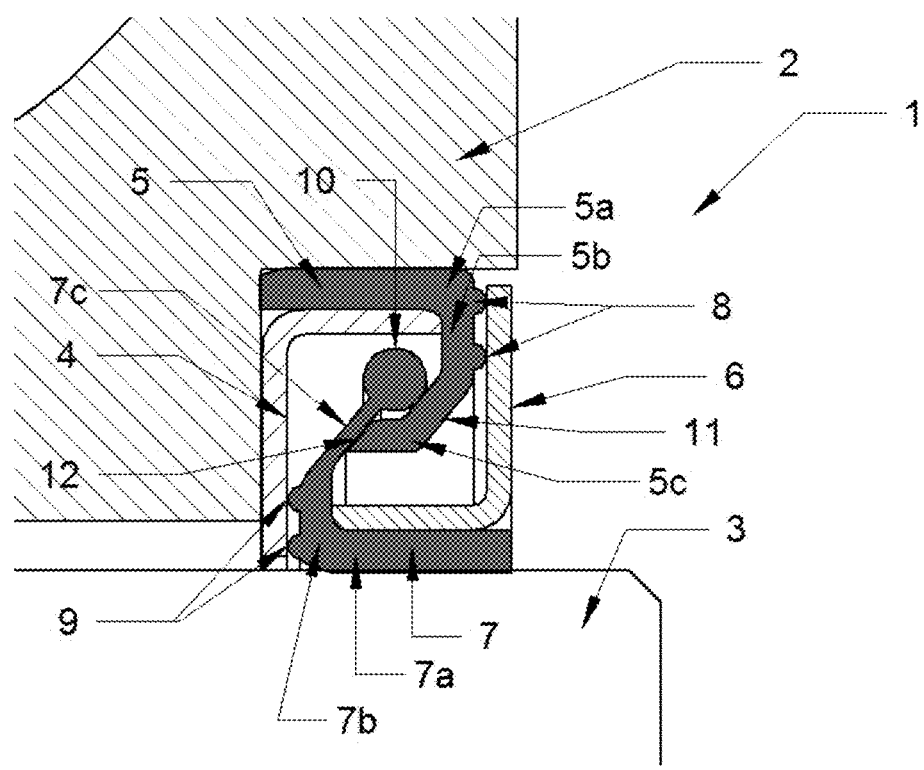
FIG. 1 shows a first embodiment of the invention in a stationary state.

FIG. 1 shows a seal system 1 comprising a stationary bearing chamber housing 2 and a rotating component shaft 3. A seal cavity is formed between the bearing chamber housing 2 and the rotating shaft 3. The stationary bearing chamber housing 2 is provided with an elastomeric ring 5 along the surface of the seal cavity that is distal from the shaft 3. This distal surface is also the internal surface of the stationary housing 2 at the seal cavity. The elastomeric ring 5 comprises a stationary housing contacting portion 5a, an extension portion 5b extending in the direction of the shaft 3 and, preferably, perpendicular to the house contacting portion 5a, and an angled section 11, which extends towards at an angle towards the shaft 3 and internal to the seal cavity. The elastomeric ring 5 further comprises an end portion 5c that is formed substantially parallel to the stationary housing contacting portion 5a. Thus, the elastomeric ring 5 substantially forms a hook shape, or a U-shape with uneven-length ends, wherein it extends in an arc, comprising angled sections, back towards its stationary housing contacting portion 5a with a recess formed between the end of the portion 5c and the other end 5a.

An L-shaped metallic ring 4 is provided on the stationary bearing chamber housing 2, which connects to the wall of the stationary bearing chamber housing 2 within the seal cavity along its first part. The second part of the L-shaped metallic ring 4 extends substantially parallel with the seal cavity wall that is distal from the shaft to create a channel in which the elastomeric ring 5 is retained. Thus, the elastomeric ring 5 is held between the L-shaped ring 4 and the wall of the stationary bearing chamber housing distal from the shaft 2.

The rotating component shaft 3 is provided with a resiliently flexible rotary elastomeric shaft member 7. The elastomeric shaft member 7 comprises a shaft contacting portion 7a, which extends partially along the surface of the shaft 3 that is located within the seal cavity. An extension 7b of the elastomeric shaft member 7 extends into the seal cavity, preferably substantially perpendicularly to the shaft contacting portion 7a. There is a further extension 7c of the elastomeric shaft member 7, which extends on an angle away from the shaft contacting portion 7a and away from the extension 7b, thus in the direction of the surface of the stationary bearing chamber housing 2 that is distal from the shaft 3 within the seal cavity. The elastomeric shaft member 7 also forms a hook shape, or a U-shaped profile. The distal end of the extension 7c is provided with a bulbous profile.

A rotary L-shaped metallic ring 6 is provided, with one side of the ring contacting a rotating component adjacent and substantially perpendicular to the shaft 3. The other side of the rotary L-shaped ring 6 extends substantially parallel with the shaft 3, extending into the seal cavity, and creates a channel with the shaft into which the shaft contacting portion 7a of the elastomeric shaft member 7 is positioned.

The distal ends of the elastomeric members 5 and 7 engage one another, or interlock with one another, so that, in a rest position, the bulbous end of the elastomeric shaft member 7 is in contact with the angled section 11 of the elastomeric ring 5. This creates a closed gate through which fluid cannot pass from the rotary side of the seal system through to the stationary side of the seal system.

The extension portion 5b of the elastomeric member 5 is provided with protrusions, or nibs, 8 that contact the rotary L-shaped ring 6. Likewise, the extension 7b is provided with protrusions 9 that contact the stationary L-shaped ring 4. Whilst two are shown in the figures, and whilst it is preferably to have more than one protrusion to assist with aligning the parts on installation, a single protrusion may be used.

Figure 2:
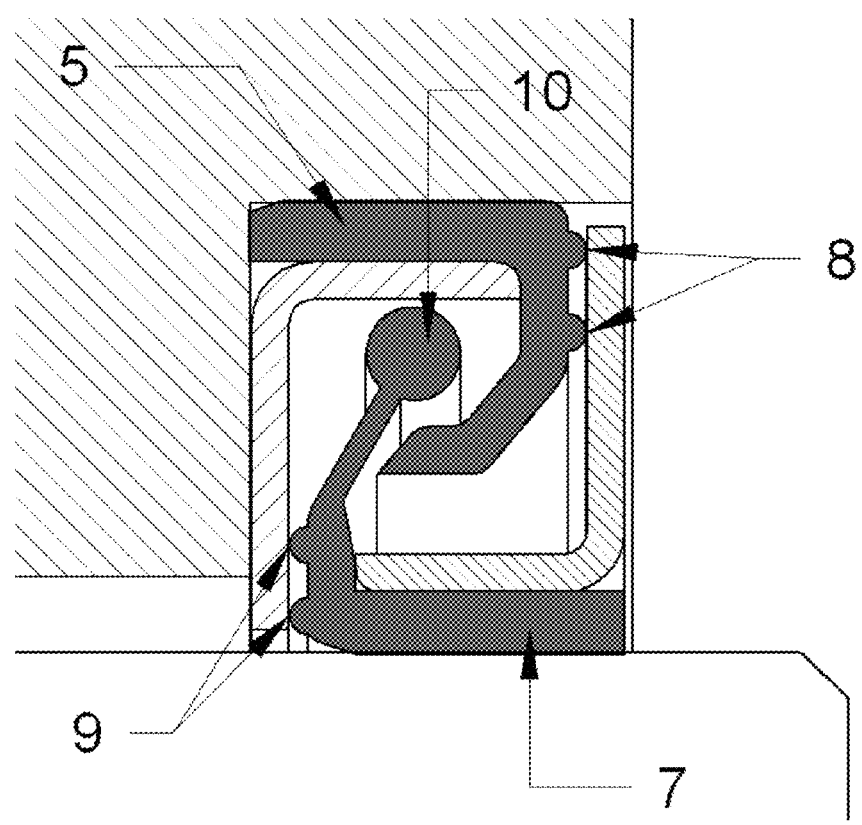
FIG. 2 shows the embodiment of FIG. 1 in a rotating state.

FIG. 2 shows an operating position of the seal system, wherein the rotating component shaft 3 is rotating. In such a state, the bulbous end of the rotary elastomeric member 7 disconnects with the elastomeric member 7 due to centripetal forces. Thus, the gate formed between the elastomeric members 5 and 7 is opened. The movement of the bulbous end of the rotary elastomeric member 7 allows for the passage of air from within the bearing chamber housing 2 as the air therein increases due to thermal expansion. The disengaging of the elastomeric members also reduces the likelihood of those parts wearing during rotation of the shaft 3.

On rotation of the shaft 3, the protrusions 8 and 9 wear to create a gap between the extensions 5b and 7b of the respective elastomeric members 5 and 7 and the respective L-shaped rings 4 and 6.

To describe FIGS. 1 and 2 in another manner, according to the present invention 1 a seal is created between a stationary component such as a bearing chamber housing 2 and a rotating component such as a shaft 3. The invention comprises a combination of stationary components and a combination of rotary components interlocked together to provide a unitised assembly.

In the primary embodiment of the invention the stationary component comprises a stationary L-shaped metallic ring 4 which is radially and axially located into a stationary elastomeric ring 5. The stationary elastomeric ring 5 locates in the chamber 2 providing a fluid tight seal between the chamber inner surface and outer diameter of the invention. The rotary components of the primary embodiment of the invention 1 comprises of a rotary L-shaped metallic ring 6. The cross section of the rotary metallic member is a 45 degree reflection of the primary metallic ring 4. The rotary metallic ring 6 is axially and radially located on the rotary elastomeric member 7. The general cross sectional profile of the rotary elastomeric member 7 is a horizontal reflection of the stationary elastomeric member profile 5. The rotary elastomeric ring 5 locates onto the shaft 3 providing a fluid tight seal between the shaft outer surface and inner diameter of the invention.

In the primary embodiment of the invention the profile of the rotary elastomeric member 7 is largely L-shaped with an angled section on top of which is located a toroidal section 10. In stationary position the toroidal section 10 locates on an angled section 11 of the stationary elastomeric member 5 providing a seal between the components. The stationary elastomeric member 5 also includes a horizontal section 12 at the end of the profile which provides a resting location for the rotary elastomeric member 7 and a secondary seal between the two elastomeric members 5 and 7 in stationary state.

In the primary embodiment of the invention 1 the stationary elastomeric member 5 has semi toroidal profiles 8 in contact with the rotary metallic member 6. The rotary elastomeric member 7 has the same semi toroidal profiles 9 in contact with the stationary metallic member 4. The toroidal profiles 8 & 9 ensure that the toroidal section 10 of the rotary elastomeric member 5 is located in the correct position on installation of the invention.

In rotary state, refer to FIG. 2, the toroidal profile 10 on the rotary elastomeric member 7 lifts from its resting location on the stationary elastomeric member 5 due to centripetal force. The lift provides an air gap between the two components allowing air flow from the chamber as the air in the chamber expands due to an increase in temperature. The lift also ensures that there is minimal friction between the stationary and rotary components during operation ensuring that the invention will not deteriorate over time. The wearing of parts is solely limited to the toroidal profiles 8 and 9 which will be worn on first start up after which a slight gap will ensure that no more contact occurs.

Figure 3:
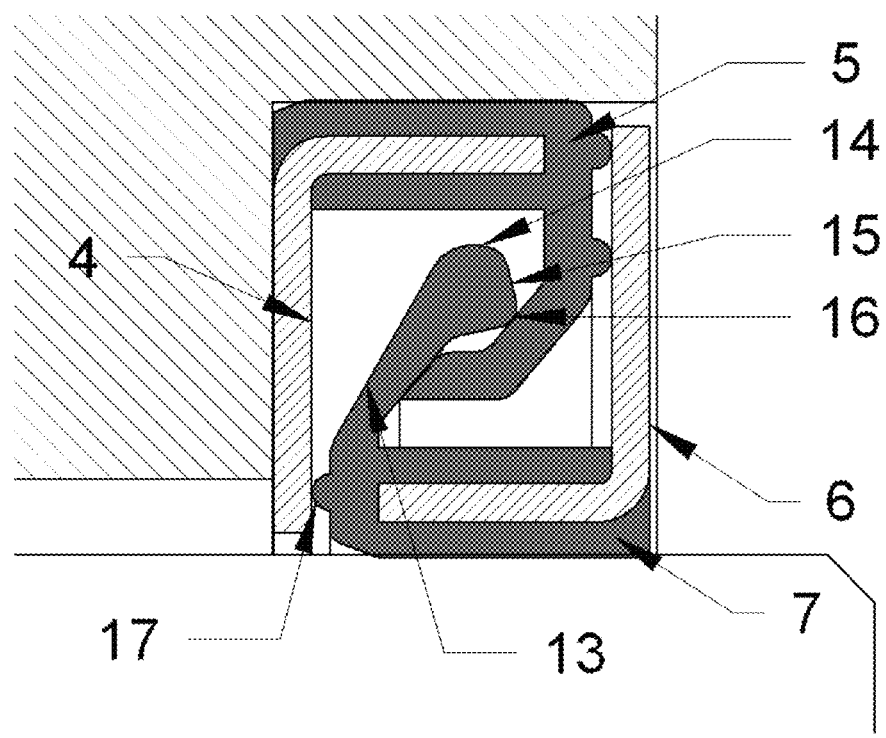
FIG. 3 shows a second embodiment of the invention in a stationary state.

In a second embodiment of the present invention, as shown in FIG. 3, the stationary metallic L-shaped rig 4 is partially integrated into the stationary elastomeric member 5 and the rotary metallic member 6 is partially integrated into the rotary elastomeric member 7. The elastomeric members 5 and 7 are provided with recesses in their respective contacting portions that allow the respective L-shaped rings to be inserted therein. The integration of the metallic members 4 and 6 ensures that the elastomer and metal do not become detached during installation of the invention. The profile of the end of the rotary elastomeric member 7 in the secondary embodiment comprises a tangentially angled surface 13 connected to an arc profile 14 which is connected via an angled section 15 to a radial portion 16 which seals against the stationary elastomeric member 7 in stationary state. Due to space constraints in the secondary embodiment of the invention there resides a single protrusion 17 on the rotary elastomeric member 7.

Figure 4:
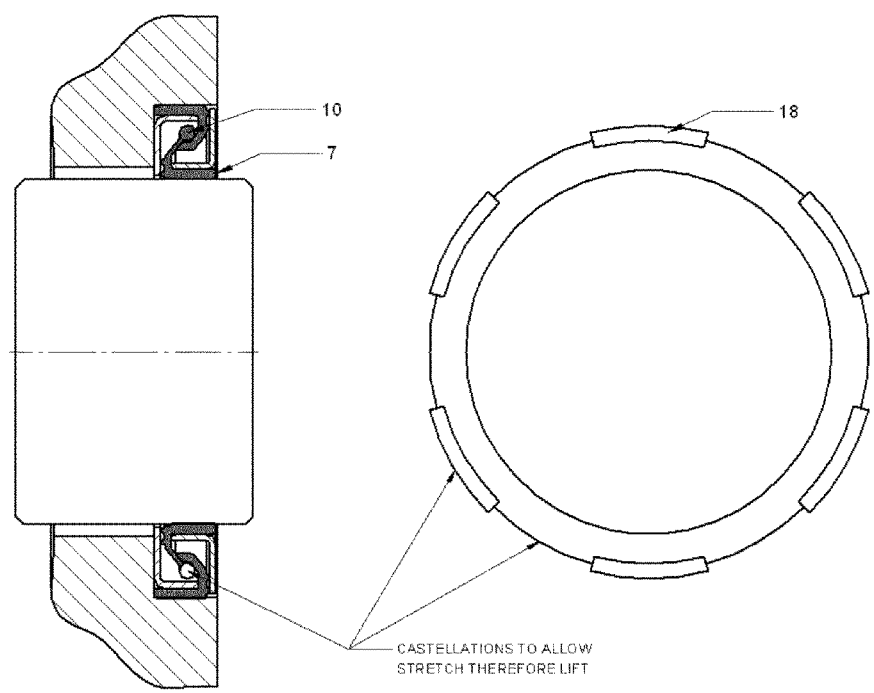
FIG. 4 shows a third embodiment of the invention in a stationary state with castellations on the rotary component.

In a third embodiment of the invention, as shown in FIG. 4, the invention is essentially the same as the first and second embodiments of the invention as shown in FIG. 1 and FIG. 3, respectively, however the profile 10 on the end of the rotary elastomeric member 7 is made up of a plurality of portions 18 axially spaced around the outer circumference of the rotary elastomer member 7.

Figure 5:
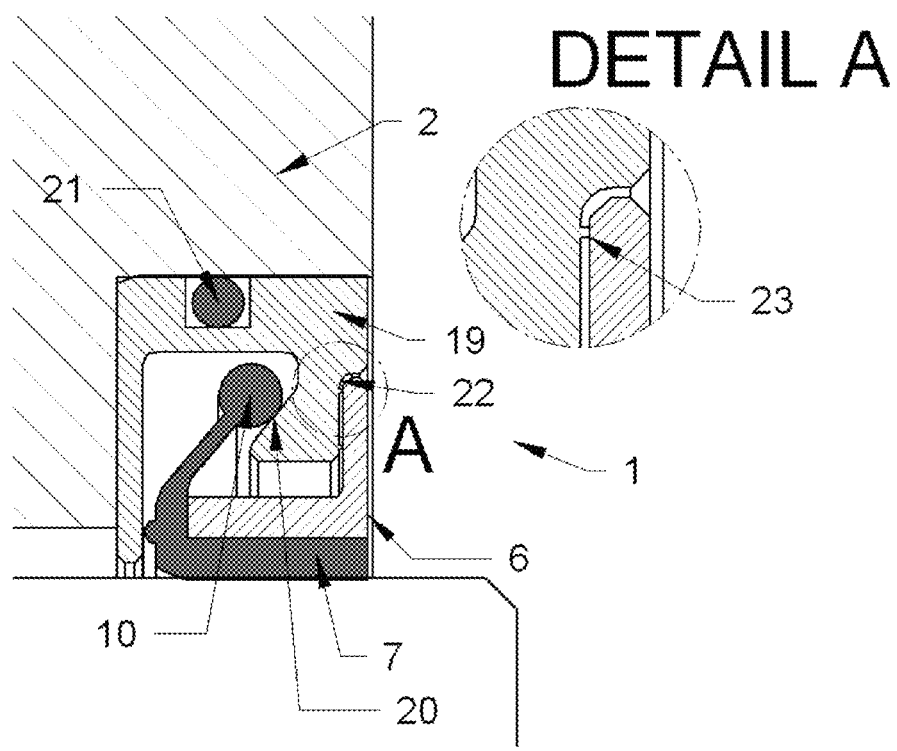
FIG. 5 shows a fourth embodiment of the invention with a machined stationary and O-ring sealing to the chamber housing.

In a fourth embodiment of the invention, as shown in FIG. 5, the rotary elastomeric member 7 and the rotary metallic member 6 are of a similar profile and configuration as in the first, second and third embodiments of the invention, shown in FIG. 1, FIG. 3 and FIG. 4, respectively. However, the stationary assembly comprises a monolithic stationary component 19, preferably of metallic construction, comprising an angled surface 20 upon which the rotary elastomer member 10 sits when in a rest position, thereby providing a sealing arrangement. A sealing member 21 resides in an annulus groove located on the outer diameter of the stationary member 19 providing a seal between the seal system 1 and the bearing chamber housing 2. A secondary annulus groove 22 is located on the outer most surface of the stationary component 19, in which the rotary metallic member 6 protrudes radially. Minute axial protrusions 23 from the stationary component 19 contact the rotary component 6 ensuring a gap between the rotary 6 and stationary component 17 is maintained during installation. The protrusions 23 are worn on start up.

Figure 6:
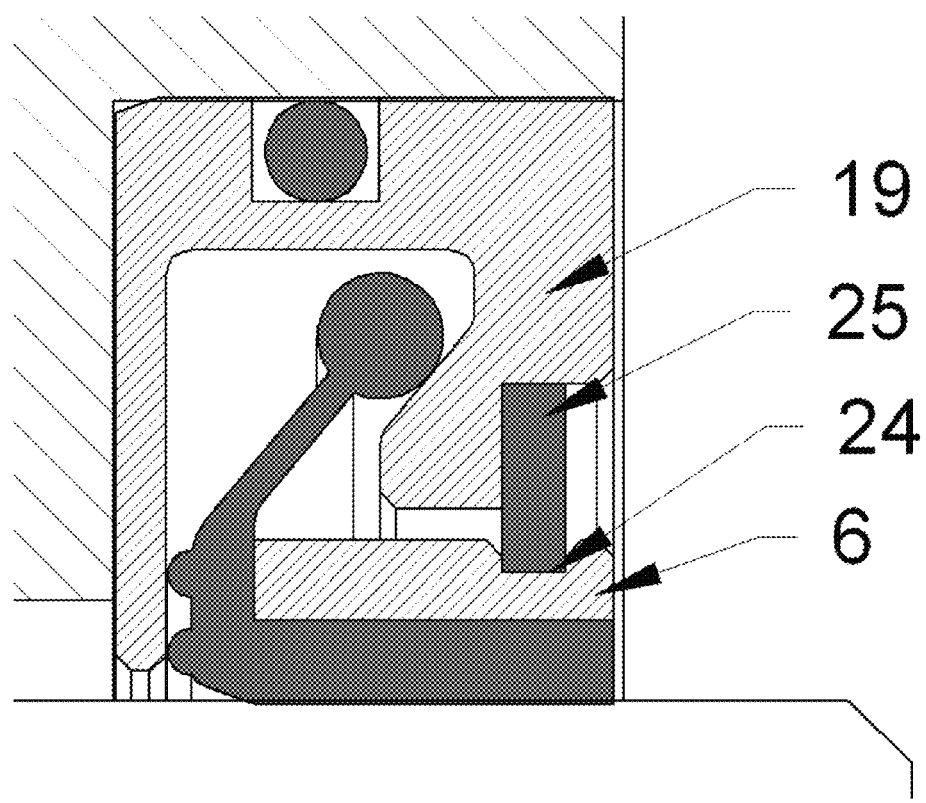
FIG. 6 shows a fifth embodiment of the invention fully machined stationary component.

In the fifth embodiment of the invention, as shown in FIG. 6; the rotary metallic component 6 is of a cylindrical profile with an annulus groove 24 residing on the outer surface. In the groove 24 resides a ring of low frictional coefficient material 25, preferably PTFE, which is in contact with the stationary monolithic component 19 allowing the invention to be unitised.

Figure 7:
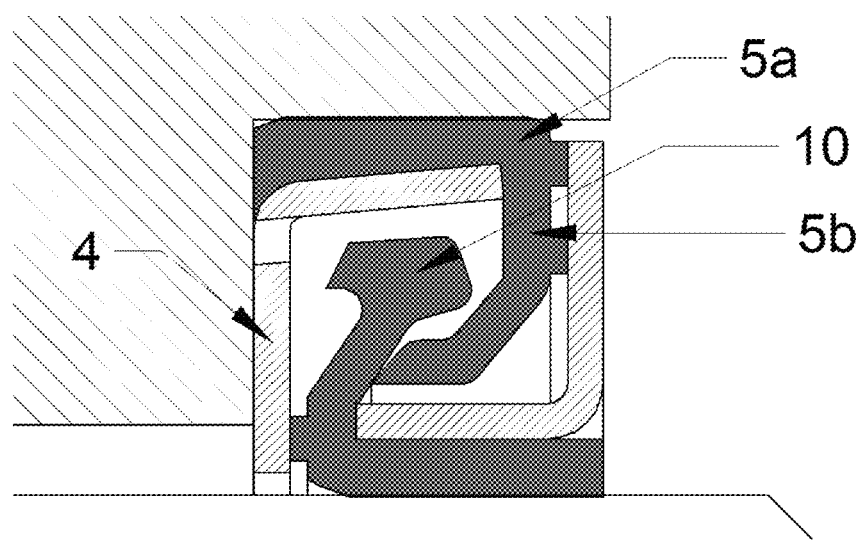
FIG. 7 shows a sixth embodiment of the present invention.
Figure 8:
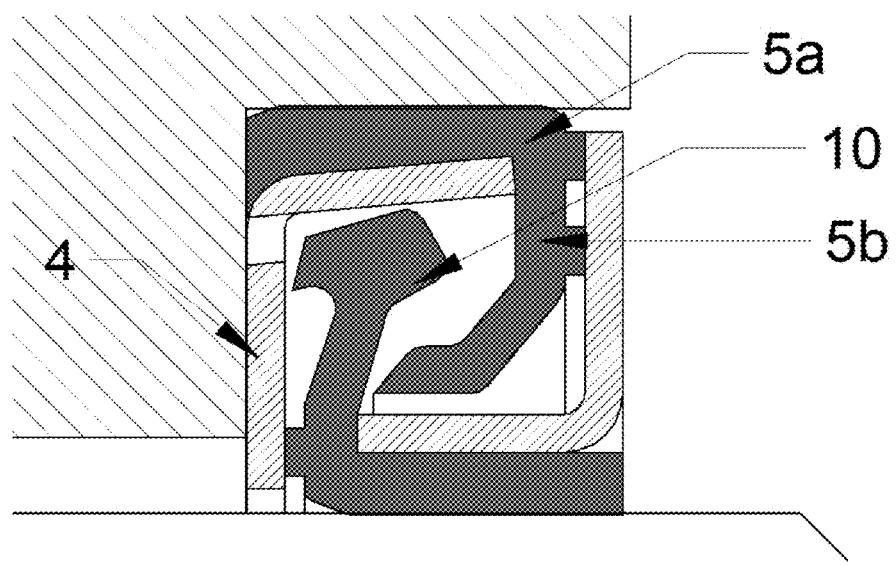
FIG. 8 shows a second position of the embodiment of FIG. 7.

In a sixth embodiment of the present invention, as shown in FIGS. 7 and 8, a system is provided having many features in common with the embodiment of FIGS. 1 and 2. However, the end of the rotary elastomeric member 7 is shaped with a cross-sectional profile similar to that of a hammer head, or gun. The fore part of the end of the elastomeric member 7 is essentially rectangular with curved corners and the rear of the elastomeric member 7 is provided with an extension. Furthermore, the arm of the L-shaped ring 4 that is distal from the shaft 3 is connected to the other arm of the L-shaped ring 4 at an obtuse internal angle. Therefore, the position of the arm extends further from the shaft 3 along its position from the adjoining arm. Accordingly, the part 5a of the stationary elastomeric member 5 that is arranged parallel with the distal edge of the stationary part 2 is tapered such that it narrows towards the extension 5b. Such an arrangement retains the stationary elastomeric member 5 in a more effective manner. Additionally, the obtuse angle on the L-shaped ring 4 assists with draining oil from within the seal cavity. The hammer head profile 10 increases the mass of the end of the rotary elastomeric member 7 and may also provide a range of motion limiter to prevent the end of the rotary elastomeric member 7 from extending too far from the stationary surface and creating too larger a gap in the seal system.

The parts that are worn upon rotation of the shaft, for example the protrusions on the elastomeric members and the protrusions 23 on the metallic stationary component 19, are sacrificial parts that are used for the correct installation of the arrangement but are then intentionally worn away to reduce the friction between the parts. The sacrificial parts may comprises a softer material than the material in which they are in contact with during installation to ensure that the sacrificial parts wear away and not the part that they contact.

The profile provided on the end of the rotating elastomeric member is relatively larger in cross-section than the rest of the elastomeric member. This provided the end of the elastomeric member with a relatively larger mass, thereby increasing the centripetal effect induced on the end compared with the rest of the member.

Where the embodiments of the present invention refer to an angled surface on the stationary assembly, a surface substantially parallel with the shaft may also be employed. Whilst this is less efficient in providing a closed seal assembly, it may be desirable for the stationary part to have a surface that is at an angle substantially parallel with the shaft and for rotation of the rotary elastomeric member to 'lift' the end of the rotary elastomeric member from that surface.

The invention claimed is:
1. A seal system comprising:
a stationary assembly interlocking with a rotary assembly, wherein the stationary and rotary assemblies are coaxial on a central axis comprising a first axial side and a second axial side;
the stationary assembly comprising an outer section radially outside the rotary assembly and an axially extending section extending toward the central axis;
the rotary assembly comprising an elastomeric component comprising an angled section having a cross section profile not parallel or perpendicular to the central axis;
wherein the system is configured so that when in a rest position the rotary elastomeric member contacts the stationary assembly on a first assembly side toward the first axial side to seal a gap therebetween;
wherein the system is configured so that when in a rest position the rotary elastomeric member does not contact the stationary assembly on a second assembly side toward the second central axial side; and,
wherein the rotary assembly is configured so that on rotation of the rotary assembly centripetal force urges the rotary assembly elastomeric member to bend out of the contact with the stationary assembly;
wherein the stationary assembly axially extending section comprises a stationary angled section surface profile, and the rotary elastomeric section contacts the stationary assembly axially extending section at a point where the stationary angled section surface profile is not parallel or perpendicular to the central axis;

wherein the elastomeric angled section of the rotary assembly contacts the stationary assembly axially extending section at two separate locations; and, wherein neither of the two stationary assembly contact locations are parallel or perpendicular to the central axis.

2. The seal system of claim 1, wherein the rotary assembly further comprises a metal ring with a cross-section profile perpendicular to the central axis, the metal ring comprising a first component extending parallel to a radial from the central axis.

3. The seal system of claim 2, wherein a portion of the elastomeric component extends inside (axially) the metal ring first component parallel to the central axis.

4. The seal system of claim 2, wherein the metal ring further comprises a second component extending perpendicular to the central axis.

5. The seal system of claim 1, wherein the rotary assembly includes only one elastomeric component comprising the angled section cross section profile not parallel or perpendicular to the central axis.

6. The seal system of claim 1, wherein whether the rotary assembly is rotating or not rotating relative to the stationary assembly a cross section through the angled section presents an angled profile not parallel or perpendicular to the central axis.

7. The seal system of claim 1, further comprising a shaft aligned with the central axis.

8. The seal system of claim 1, wherein the stationary assembly and the rotary elastomeric member both comprise U-shaped profiles interlocking with one another with the rotary elastomeric member contacting an internal surface of the U-shaped stationary assembly.

9. The seal system of claim 1, wherein the axially extending section of the stationary assembly comprises a rigid angled profile at a location where the rotary assembly contacts the stationary assembly.

10. The seal system of claim 1, wherein the stationary assembly or the rotary elastomeric member is provided with at least one sacrificial protrusion.

11. The seal system of claim 1, wherein the central axis is central to the assemblies and perpendicular to a major plane of the interlocked assemblies.

12. The seal system of claim 1, wherein said sealing contact of the elastomeric member with the stationary assembly does not include contact with a stationary assembly surface that is parallel or perpendicular to the central axis.

* * * * *